United States Patent
Lai et al.

(10) Patent No.: US 9,431,643 B2
(45) Date of Patent: Aug. 30, 2016

(54) SEPARATOR OF LITHIUM-ION-BATTERY PREPARATION AND METHOD THEREOF

(71) Applicant: Dongguan Amperex Technology Limited, Dongguan (CN)

(72) Inventors: Xulun Lai, Dongguan (CN); Xinzhi Zhang, Dongguan (CN); Qian Xiu, Dongguan (CN); Yaoming Deng, Dongguan (CN); Laiyong Xie, Dongguan (CN); Hui Jiang, Dongguan (CN); Ying Wang, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 121 days.

(21) Appl. No.: 14/253,809

(22) Filed: Apr. 15, 2014

(65) Prior Publication Data
US 2014/0322587 A1    Oct. 30, 2014

(30) Foreign Application Priority Data

Apr. 25, 2013    (CN) .......................... 2013 1 0147483

(51) Int. Cl.
| | |
|---|---|
| *H01M 2/16* | (2006.01) |
| *H01M 2/14* | (2006.01) |
| *H01M 10/42* | (2006.01) |
| *H01M 10/0525* | (2010.01) |

(52) U.S. Cl.
CPC ............. *H01M 2/166* (2013.01); *H01M 2/145* (2013.01); *H01M 2/1686* (2013.01); *H01M 10/0525* (2013.01); *H01M 10/4235* (2013.01)

(58) Field of Classification Search
CPC ........ H01M 2/14; H01M 2/145; H01M 2/16; H01M 2/166; H01M 2/1686
See application file for complete search history.

(56) References Cited

U.S. PATENT DOCUMENTS

| 5,091,272 A * | 2/1992 | Treger ................ H01M 2/1653 427/195 |
| 6,432,586 B1 * | 8/2002 | Zhang .................. H01M 2/164 429/231.95 |
| 2005/0221165 A1 * | 10/2005 | Hennige .................... C08J 7/06 429/62 |

OTHER PUBLICATIONS

Daniel H. Doughty, FreedomCar, Electrical Energy Storage System Abuse Test Manual for Electric and Hybrid Electric Vehicle Application, *SAND* 2005-3123, unlimited release printed Aug. 2006, 47 pgs.

* cited by examiner

*Primary Examiner* — Carlos Barcena
(74) *Attorney, Agent, or Firm* — Morgan, Lewis & Bockius LLP

(57) ABSTRACT

The present disclosure relates to a separator of a lithium-ion battery and a preparation method thereof, the separator comprises a substrate membrane and a coating provided on a surface of the substrate membrane, the coating comprises ceramic particles, an adhesive and a solid polymer wax which has a melting point of 85~120° C., a molecular weight of 1,000~25,000 and a particle size of 0.5~10 μm. When the lithium-ion battery is heated due to overcharge and the like to make the interior temperature reach the melting point of the solid polymer wax, the solid polymer wax can be melt and enter among the ceramic particles and into the micropores of the substrate membrane by capillarity so as to function as electrical disconnection, which can effectively cut off the channel of the lithium ions and stop the overcharge, and ensure the safety performance of the lithium-ion battery under the situation of overcharge.

16 Claims, 3 Drawing Sheets

SEPARATOR OF LITHIUM-ION-BATTERY PREPARATION AND METHOD THEREOF

REFERENCE TO RELATED APPLICATIONS

The present disclosure claims priority to Chinese Patent Application No. CN 201310147483.3 filed on Apr. 25, 2013, the content of which is fully incorporated in its entirety herein.

FIELD OF THE PRESENT DISCLOSURE

The present disclosure relates to a field of a lithium-ion battery technology, and more specifically to a separator of a lithium-ion battery, which has a good safety performance, and a preparation method thereof.

BACKGROUND OF THE PRESENT DISCLOSURE

Since the lithium-ion battery has been commercialized, due to advantages, such as a high energy density, a high operating voltage, none memory effect and a long cycle life and the like, the lithium-ion battery is widely used as a power supply for various mobile devices. With large scale applications of the lithium-ion battery, the safety problem of the lithium-ion battery is increasing significantly.

The lithium-ion battery mainly comprises a positive electrode plate, a negative electrode plate, a separator and an electrolyte. The separator is provided between the positive electrode plate and the negative electrode plate, and mainly functions to: physically isolate the positive electrode plate and the negative electrode plate of the lithium-ion battery so as to prevent an interior short circuit between the positive electrode plate and the negative electrode plate, ensure the lithium ions to pass the electrolyte and move back and forth uniformly and freely between the positive electrode plate and the negative electrode plate, and cut off the channel of the lithium ions to prevent the further thermal runaway due to micropore self-shutdown ability of the separator at a too high temperature.

Three-layered polypropylene/polyethylene/polypropylene composite separator can more effectively provide a thermal shutdown compared with a single-layer polyethylene separator or a single-layer polypropylene separator. Herein, the polypropylene layer functions as a support framework, when the interior temperature of the lithium-ion battery rises close to the melting point of PE, the micropores in the polyethylene layer will be shut down, thereby cutting off the channel of the lithium ions. A temperature range of the thermal shutdown is substantially between the melting point of the polyethylene layer and the melting point of the polypropylene layer, and is about 140° C.~160° C. However, many safety tests have shown that: a more serious safety hazard will occur when the temperature of the lithium-ion battery rises to be equal to or more than 100° C., and the temperature of the shutdown of the polyethylene layer is high as 130° C., when the temperature of the lithium-ion battery reaches 130° C., the shutdown of the polyethylene layer cannot effectively function as a safety protection. And the safety performance of the single-layer polyethylene separator and the single-layer polypropylene separator are worse.

In practice when the lithium-ion battery is abused (such as overcharge, thermal shock and puncture and the like), the temperature of the lithium-ion battery generally will rise to be equal to or more than 90° C., once the interior temperature of the lithium-ion battery is more than 90° C., the conventional polyethylene separator, polypropylene separator will have a more serious thermal shrinkage, a short circuit would be established between the positive electrode plate and the negative electrode plate and more heat would be generated, the lithium-ion battery would be easily fired or even exploded. Regarding this situation, a person skilled in the art generally will coat a layer containing ceramics onto the separator so as to reduce the thermal shrinkage and prevent the short circuit between the positive electrode plate and the negative electrode plate from being established, which however does not work on the abuses which more easily happen (such as overcharge and the like), this is because the positive electrode plate and the negative electrode plate of the lithium-ion battery will generate large amount of heat under the situation of overcharge, even if the ceramics separator does not shrink, the overcharge still continues, and the capacity continues to increase, the voltage accordingly rises, finally the heat generated from the reactions between the electrode plates and the electrolyte becomes too large, the lithium-ion battery will be fired or even exploded. In order to ensure the safety under the situation of the overcharge, the channel of the lithium ions must be cut off when the lithium-ion battery is overcharged, so that the overcharge would be stopped, and in turn the safety of the lithium-ion battery under the situation of overcharge would be ensured.

SUMMARY OF THE PRESENT DISCLOSURE

Accordingly, it is necessary to provide a separator of a lithium-ion battery, which can cut off the channel of the lithium ions under the situation of overcharge and has a better safety performance, and a preparation method thereof.

In view of the deficiencies in the existing technology, an object of the present disclosure is to provide a separator of a lithium-ion battery, which can cut off the channel of the lithium ions under the situation of overcharge, and has a better safety performance so as to overcome the deficiency in the existing technology that the separator cannot cut off the channel of the lithium ions when the lithium-ion battery is overcharged and in turn cannot ensure the safety of the lithium-ion battery when the lithium-ion battery is overcharged.

In order to achieve the above object, the present disclosure adopts the following technical solutions:

A separator of a lithium-ion battery comprises a substrate membrane and a coating provided on a surface of the substrate membrane, the coating comprises 10~70 wt % of ceramic particles, 20~80 wt % of a solid polymer wax and 5~20 wt % of an adhesive, a melting point of the solid polymer wax is 85~120° C., a molecular weight of the solid polymer wax is 1,000~25,000, a particle size of the solid polymer wax is 0.5~10 μm, and the particle size of the solid polymer wax is larger than a pore size of the substrate membrane.

The temperature of the shutdown of the polyethylene layer is 130° C., when the interior temperature of the lithium-ion battery is above 90° C., both of the polyethylene separator and the polypropylene separator will greatly shrink to cause a risk of short circuit, therefore, the ceramic particles are provided on the surface of the substrate membrane so as to reduce the shrinkage of the separator, and since the melting point of the solid polymer wax is selected as 90~120° C., the solid polymer wax can be melt before the shutdown of the polyethylene occurs and enter among the ceramic particles and into the micropores of the substrate membrane by capillarity, thereby effectively cutting off the channel of the lithium ions to stop the overcharge. That the particle size of the solid polymer wax is larger than the pore size of the substrate membrane can prevent the solid polymer wax from blocking the micropores of the substrate membrane during normal use to make the transportation of the lithium ions not smooth and affect the normal use of the lithium-ion battery.

In an embodiment of the separator of the lithium-ion battery, the ceramic particle is selected from at least one of aluminum oxide particle, zirconium oxide particle and titanium oxide particle, these ceramic particles have a better insulation performance to reduce the thermal shrinkage of the substrate membrane, and these ceramic particles are low-cost.

In an embodiment of the separator of the lithium-ion battery, the solid polymer wax is selected from at least one of polyethylene wax, polyethylene oxide wax and polypropylene wax.

In an embodiment of the separator of the lithium-ion battery, the adhesive is selected from at least one of styrene-acrylic latex, pure acrylic latex and styrene-butadiene rubber latex.

In an embodiment of the separator of the lithium-ion battery, the coating further comprises 5~15 wt % of a water-soluble polymer thickening agent, so as to strengthen the stability of the coating slurry and ensure a better dispersion of the coating slurry.

In an embodiment of the separator of the lithium-ion battery, the water-soluble polymer thickening agent is selected from at least one of carboxyethyl cellulose, sodium carboxymethyl cellulose, polyacrylamide, sodium alginate and polyvinyl alcohol.

In an embodiment of the separator of the lithium-ion battery, a thickness of the coating is 0.5~10 μm. If the thickness of the coating is too small, the coating cannot effectively function as reducing the shrinkage of the separator and cutting off the channel of the lithium ions when the lithium-ion battery is overcharged; if the thickness of the coating is too large, the coating will affect the transportation efficiency of the lithium ions during normal use to some extent, and further affect the cycle performance and the rate performance of the lithium-ion battery.

In an embodiment of the separator of the lithium-ion battery, an average particle diameter of the ceramic particles is 500~3,000 nm, preferably, the particle diameter of the ceramic particles should be larger than the pore size of the substrate membrane, so as to prevent the ceramic particles from blocking the micropores of the substrate membrane during the normal use of the separator to make the transportation of the lithium ions not smooth and affect the normal use of the lithium-ion battery.

In an embodiment of the separator of the lithium-ion battery, the substrate membrane is selected from at least one of polyethylene membrane, polypropylene membrane, polypropylene/polyethylene/polypropylene composite membrane, aramid membrane and polyimide membrane.

Compared with the existing technology, the coating provided on the surface of the substrate membrane in the present disclosure comprises the ceramic particles, the solid polymer wax and the adhesive, the ceramic particles have the function of reducing the thermal shrinkage of the separator and preventing the short circuit, and when the lithium-ion battery is heated due to overcharge and the like to make the interior temperature reach the melting point of the solid polymer wax, the solid polymer wax can be melt and enter among the ceramic particles and into the micropores of the substrate membrane by capillarity to function as electrical disconnection to effectively cut off the channel of the lithium ions and stop the overcharge, and prevent the voltage from being increased, and prevent the reactions between the electrode plates and the electrolyte, and further prevent the lithium-ion battery from being fired or even exploded, and ensure the safety performance of the lithium-ion battery under the situation of overcharge.

Another object of the present disclosure is to provide a preparation method of a separator of a lithium-ion battery, which comprises steps of: step 1, adding ceramic particles and solid polymer wax powders into water and obtaining a uniform mixture with stirring, then adding the uniform mixture into a ball mill for grinding to make the particle diameters of the ceramic particles and the solid polymer wax powders less than 2 μm, and obtaining a primary slurry; step 2, adding an adhesive into the primary slurry obtained in step 1 and obtaining a uniform mixture with stirring, then filtrating the uniform mixture by a 300-mesh screen, and obtaining a coating slurry; step 3, coating the coating slurry obtained in step 2 onto a surface of a substrate membrane by intaglio printing or extrusion coating, which was followed by a drying, and obtaining a separator of a lithium-ion battery.

In an embodiment, the coating is provided on both surfaces of the substrate membrane to function as a better security.

Compared with the existing technology, in the present disclosure, the ceramic particles, the adhesive and the solid polymer wax are added into the coating slurry, which can not only effectively reduce the shrinkage of the substrate membrane, but also can ensure the safety performance of the lithium-ion battery under the situation of overcharge. Moreover, solvent in the coating slurry of the present disclosure is water, which is not only safe and environment-friendly, but can reduce the cost. The preparation method of the present disclosure is simple and easily operated, and is easy to realize the industrial manufacturing.

DETAILED DESCRIPTION

Figure 1:
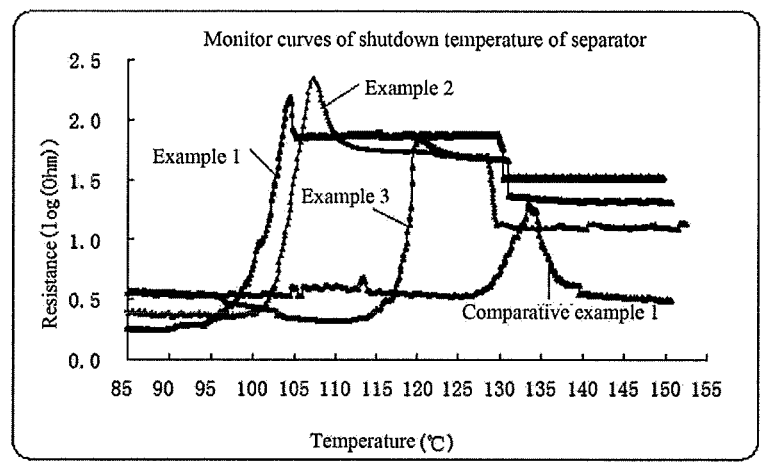
FIG. 1 illustrated monitor curves of shutdown temperature tests of separators in examples 1-3 and comparative example 1 of the present disclosure.
Figure 2:
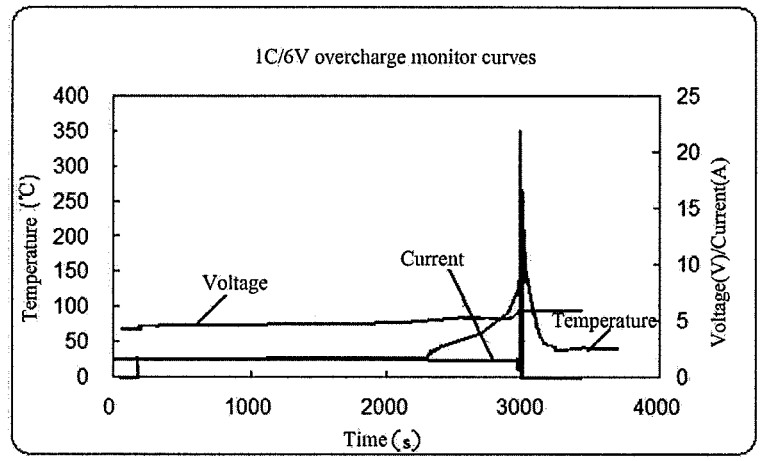
FIG. 2 illustrated monitor curves of a 1 C/6V overcharged lithium-ion battery of the present disclosure, the number of which was D1.
Figure 3:
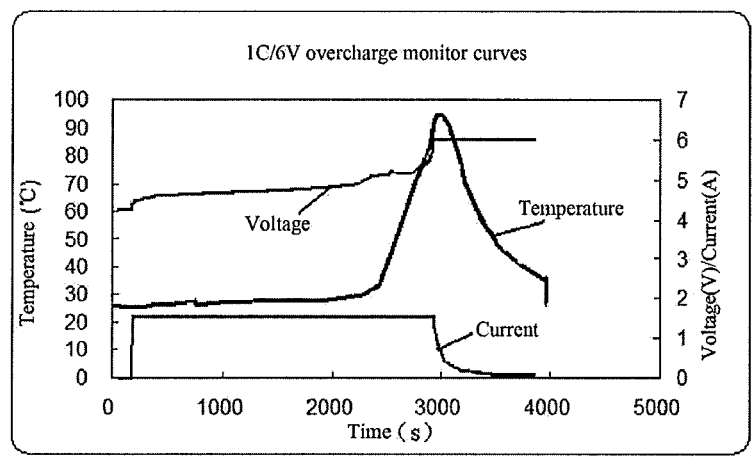
FIG. 3 illustrated monitor curves of a 1 C/6V overcharged lithium-ion battery of the present disclosure, the number of which was S1.
Figure 4:
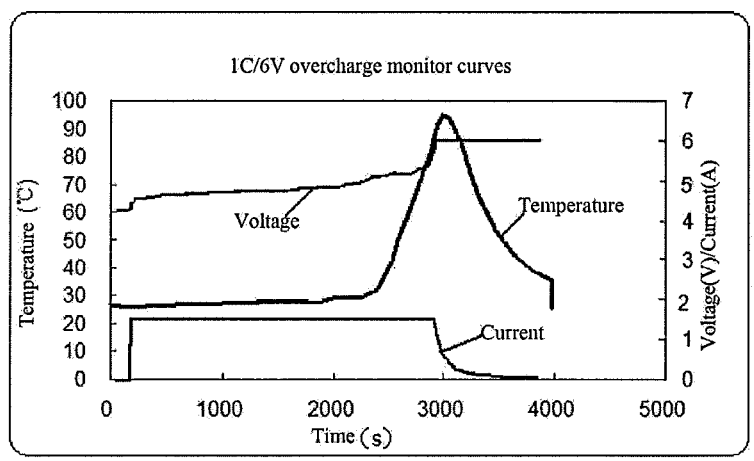
FIG. 4 illustrated monitor curves of a 1 C/6V overcharged lithium-ion battery of the present disclosure, the number of which was S2.
Figure 5:
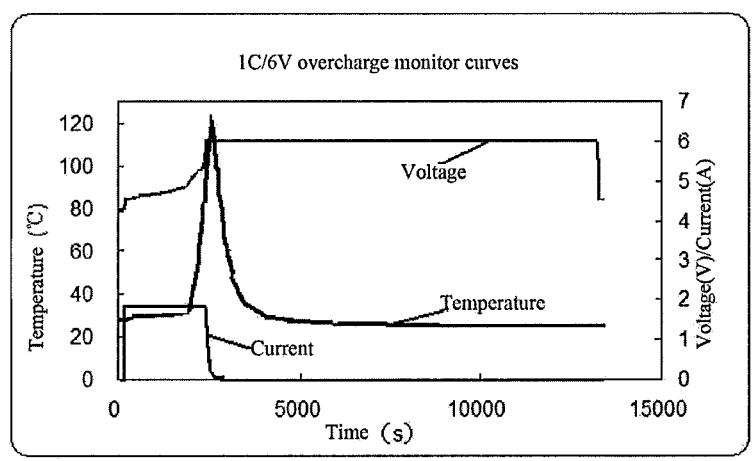
FIG. 5 was monitor curves of a 1 C/6V overcharged lithium-ion battery of the present disclosure, the number of which was S3.

Detailed descriptions of the present disclosure and the beneficial technical effects thereof will be described in connection with the accompanying Figures and the embodiments, but the present disclosure is not limited to that.

The present disclosure provides a separator of a lithium-ion battery.

EXAMPLE 1

A separator of a lithium-ion battery provided in this example comprised a substrate membrane and a coating provided on a surface of the substrate membrane, the coating comprised 55 wt % of ceramic particles, 25 wt % of a solid polymer wax, 13 wt % of an adhesive and 7 wt % of a water-soluble polymer thickening agent. The substrate membrane was polyethylene membrane with a thickness of 16 μm, the ceramic particles were aluminum oxide particles with an average particle diameter of 1,000 nm, the adhesive was styrene-acrylic latex, the water-soluble polymer thickening agent was sodium carboxymethyl cellulose; the solid polymer wax was polyethylene wax with a melting point of 100° C., a molecular weight of 10,000 and a particle size of 1 μm, and the particle size of the solid polymer wax was larger than the pore size of the substrate membrane. A thickness of the coating was 1 μm.

EXAMPLE 2

A separator of a lithium-ion battery provided in this example comprised a substrate membrane and a coating provided on a surface of the substrate membrane, the coating comprised 45 wt % of ceramic particles, 35 wt % of a solid polymer wax, 10 wt % of an adhesive and 10 wt % of a water-soluble polymer thickening agent. The substrate membrane was polypropylene membrane with a thickness of 12 μm, the ceramic particles were zirconium oxide particles with an average particle diameter of 2,000 nm, the adhesive was pure acrylic latex, the water-soluble polymer thickening agent was carboxymethyl cellulose; the solid polymer wax was polypropylene wax with a melting point of 110° C., a molecular weight of 20,000 and a particle size of 5 μm, and the particle size of the solid polymer wax was larger than the pore size of the substrate membrane. A thickness of the coating was 5 μm.

EXAMPLE 3

A separator of a lithium-ion battery provided in this example comprised a substrate membrane and a coating provided on a surface of the substrate membrane, the coating comprised 25 wt % of ceramic particles, 45 wt % of a solid polymer wax, 18 wt % of an adhesive and 12 wt % of a water-soluble polymer thickening agent. The substrate membrane was polypropylene/polyethylene/polypropylene composite membrane with a thickness of 20 μm, the ceramic particles were titanium oxide particles with an average particle diameter of 700 nm, the adhesive was styrene-butadiene rubber latex, the water-soluble polymer thickening agent was polyacrylamide; the solid polymer wax was polyethylene oxide wax with a melting point of 85° C., a molecular weight of 1,000 and a particle size of 0.5 μm, and the particle size of the solid polymer wax was larger than the pore size of the substrate membrane. A thickness of the coating was 8 μm.

EXAMPLE 4

A separator of a lithium-ion battery provided in this example comprised a substrate membrane and a coating provided on a surface of the substrate membrane, the coating comprised 60 wt % of ceramic particles, 20 wt % of a solid polymer wax, 5 wt % of an adhesive and 15 wt % of a water-soluble polymer thickening agent. The substrate membrane was aramid membrane with a thickness of 25 μm, the ceramic particles were zirconium oxide particles with an average particle diameter of 2,500 nm, the adhesive was styrene-butadiene rubber latex, the water-soluble polymer thickening agent was sodium alginate; the solid polymer wax was polyethylene oxide wax with a melting point of 95° C., a molecular weight of 3,000 and a particle size of 10 μm, and the particle size of the solid polymer wax was larger than the pore size of the substrate membrane. A thickness of the coating was 10 μm.

EXAMPLE 5

A separator of a lithium-ion battery provided in this example comprised a substrate membrane and a coating provided on a surface of the substrate membrane, the coating comprised 15 wt % of ceramic particles, 62 wt % of a solid polymer wax, 15 wt % of an adhesive and 8 wt % of a water-soluble polymer thickening agent. The substrate membrane was polyimide membrane with a thickness of 8 μm, the ceramic particles were aluminum oxide particles with an average particle diameter of 1,200 nm, the adhesive was styrene-acrylic latex, the water-soluble polymer thickening agent was polyvinyl alcohol; the solid polymer wax was polyethylene wax with a melting point of 120° C., a molecular weight of 25,000 and a particle size of 0.5 μm, and the particle size of the solid polymer wax was larger than the pore size of the substrate membrane. A thickness of the coating was 0.5 μm.

EXAMPLE 6

A separator of a lithium-ion battery provided in this example comprised a substrate membrane and a coating provided on a surface of the substrate membrane, the coating comprised 40 wt % of ceramic particles, 50 wt % of a solid polymer wax, 5 wt % of an adhesive and 5 wt % of a water-soluble polymer thickening agent. The substrate membrane was polypropylene/polyethylene/polypropylene composite membrane with a thickness of 30 μm, the ceramic particles were zirconium oxide particles with an average particle diameter of 3,000 nm and aluminum oxide particles with an average particle diameter of 500 nm (a weight ratio of the zirconium oxide particles and the aluminum oxide particles was 3:1), the adhesive was a mixture of styrene-acrylic latex and pure acrylic latex (the weight ratio of styrene-acrylic latex and pure acrylic latex was 1:1), the water-soluble polymer thickening agent was a mixture of polyvinyl alcohol and sodium carboxymethyl cellulose (a weight ratio of polyvinyl alcohol and sodium carboxymethyl cellulose was 1:3); the solid polymer wax was a mixture of polyethylene wax and polypropylene wax (a weight ratio of polyethylene wax and polypropylene wax was 4:1), a melting point of polyethylene wax was 90° C., a molecular weight of polyethylene wax was 2,000, a particle size of polyethylene wax was 3 μm, a melting point of polypropylene wax was 115° C., a molecular weight of polypropylene wax was 20,000, a particle size of polypropylene wax was 2 μm, and a particle size of the polyethylene wax, and the particle size of the polypropylene wax were larger than a pore size of the substrate membrane. A thickness of the coating was 4 μm.

COMPARATIVE EXAMPLE 1

A separator of a lithium-ion battery provided in this comparative example was a polyethylene membrane without a coating, a thickness of the polyethylene membrane was 16 μm.

COMPARATIVE EXAMPLE 2

A separator of a lithium-ion battery provided in this comparative example comprised a substrate membrane and a coating provided on a surface of the substrate membrane, the coating comprised 50 wt % of ceramic particles, 10 wt % of an adhesive and 10 wt % of a water-soluble polymer thickening agent. The substrate membrane was polyethylene membrane with a thickness of 16 μm, the ceramic particles were aluminum oxide particles with an average particle diameter of 1,000 nm, the adhesive was styrene-acrylic latex, the water-soluble polymer thickening agent was sodium carboxymethyl cellulose; a thickness of the coating was 1 μm.

The present disclosure further provides a preparation method of a separator of a lithium-ion battery.

EXAMPLE 7

A preparation method of a separator of a lithium-ion battery provided in this example comprised following steps.

Step 1, first, sodium carboxymethyl cellulose was dissolved in water to obtain a solution of sodium carboxymethyl cellulose, then aluminum oxide particles with an average particle diameter of 1,000 nm and polyethylene wax powders with a melting point was 100° C., a molecular weight of 10,000 and a particle size of 1 μm were added into the solution of sodium carboxymethyl cellulose, a uniform mixture was obtained with stirring, then the uniform mixture was added into the ball mill for grinding to make particle diameters of aluminum oxide particles and polyethylene wax powders less than 2 μm, and a primary slurry was obtained.

Step 2, styrene-acrylic latex was added into the primary slurry obtained in step 1, a uniform mixture was obtained with stirring, the uniform mixture was filtrated by a 300-mesh screen, and a coating slurry was obtained, a weight ratio of aluminum oxide particles, polyethylene wax powders, styrene-acrylic latex and sodium carboxymethyl cellulose was 55:25:13:7.

Step 3, the coating slurry obtained in step 2 was coated on a surface of polyethylene membrane by intaglio printing, which was followed by a drying, and the separator of the lithium-ion battery with a thickness of 1 μm was obtained.

EXAMPLE 8

A preparation method of a separator of a lithium-ion battery provided in this example comprised following steps.

Step 1, first, carboxymethyl cellulose was dissolved in water to obtain a solution of carboxymethyl cellulose, then zirconium oxide particles with an average particle diameter of 2,000 nm and polypropylene wax powders with a melting point was 110° C., a molecular weight of 20,000 and a particle size of 5 μm were added into the solution of carboxymethyl cellulose, a uniform mixture was obtained with stirring, then the uniform mixture was added into the ball mill for grinding to make the particle diameters of zirconium oxide particles and polypropylene wax powders less than 2 μm, and a primary slurry was obtained.

Step 2, pure acrylic latex was added into the primary slurry obtained in step 1, a uniform mixture was obtained with stirring, the uniform mixture was filtrated by a 300-mesh screen, and a coating slurry was obtained, a weight ratio of zirconium oxide particles, polypropylene wax powders, pure acrylic latex and carboxymethyl cellulose was 45:35:10:10.

Step 3, the coating slurry obtained in step 2 was coated on the surface of polypropylene membrane by extrusion coating, which was followed by a drying, and the separator of the lithium-ion battery with a thickness of 5 μm was obtained.

EXAMPLE 9

A preparation method of a separator of a lithium-ion battery provided in this example comprised following steps.

Step 1, first, polyacrylamide was dissolved in water to obtain a solution of polyacrylamide, then titanium oxide particles with an average particle diameter of 700 nm and polyethylene oxide wax powders with a melting point of 85° C., a molecular weight of 1,000 and a particle size of 0.5 μm were added into the solution of polyacrylamide, a uniform mixture was obtained with stirring, then the uniform mixture was added into the ball mill for grinding to make the particle diameters of titanium oxide particles and polyethylene oxide wax powders less than 2 μm, and a primary slurry was obtained.

Step 2, styrene-butadiene rubber latex was added into the primary slurry obtained in step 1, a uniform mixture was obtained with stirring, the uniform mixture was filtrated by a 300-mesh screen, and a coating slurry was obtained, where a weight ratio of titanium oxide particles, polyethylene oxide wax powders, styrene-butadiene rubber latex and polyacrylamide was 25:45:18:12.

Step 3, the coating slurry obtained in step 2 was coated on a surface of polypropylene/polyethylene/polypropylene composite membrane by extrusion coating, which was followed by a drying, and the separator of the lithium-ion battery with a thickness of 8 μm was obtained.

EXAMPLE 10

A preparation method of a separator of a lithium-ion battery provided in this example comprised following steps.

Step 1, first, sodium alginate was dissolved in water to obtain a solution of sodium alginate, then zirconium oxide particles with an average particle diameter of 2,500 nm and polyethylene oxide wax powders with a melting point of 95° C., a molecular weight of 3,000 and a particle size of 10 μm were added into the solution of sodium alginate, a uniform mixture was obtained with stirring, then the uniform mixture was added into the ball mill for grinding to make the particle diameters of zirconium oxide particles and polyethylene oxide wax powders less than 2 μm, and a primary slurry was obtained.

Step 2, styrene-butadiene rubber latex was added into the primary slurry obtained in step 1, a uniform mixture was obtained with stirring, the uniform mixture was filtrated by a 300-mesh screen, and a coating slurry was obtained, where a weight ratio of zirconium oxide particles, polyethylene oxide wax powders, styrene-butadiene rubber latex and sodium alginate was 60:20:5:15.

Step 3, the coating slurry obtained in step 2 was coated on a surface of aramid membrane by intaglio printing, which was followed by a drying, and the separator of the lithium-ion battery with a thickness of 10 μm was obtained.

EXAMPLE 11

A preparation method of a separator of a lithium-ion battery provided in this example comprised following steps.

Step 1, first, polyvinyl alcohol was dissolved in water to obtain a solution of polyvinyl alcohol, then aluminum oxide particles with an average particle diameter of 1,200 nm and polyethylene wax powders with a melting point of 120° C., a molecular weight of 25,000 and a particle size of 0.5 μm were added into the solution of polyvinyl alcohol, a uniform mixture was obtained with stirring, then the uniform mixture was added into the ball mill for grinding to make the particle diameter of aluminum oxide particles and polyethylene wax powders less than 2 μm, and a primary slurry was obtained.

Step 2, styrene-acrylic latex was added into the primary slurry obtained in step 1, a uniform mixture was obtained with stirring, the uniform mixture was filtrated by a 300-mesh screen, and a coating slurry was obtained, where a weight ratio of aluminum oxide particles, polyethylene wax powders, styrene-acrylic latex and polyvinyl alcohol was 15:62:15:8.

Step 3, the coating slurry obtained in step 2 was coated on a surface of polyimide membrane by intaglio printing, which was followed by a drying, and the separator of the lithium-ion battery with a thickness of 0.5 μm was obtained.

EXAMPLE 12

A preparation method of a separator of a lithium-ion battery provided in this example comprised following steps.

Step 1, first, polyvinyl alcohol and sodium carboxymethyl cellulose were dissolved in water to obtain a mixed solution of polyvinyl alcohol and sodium carboxymethyl cellulose, then zirconium oxide particles with an average particle diameter of 3,000 nm, aluminum oxide particles with an average particle diameter of 500 nm, polyethylene wax powders with a melting point of 90° C., a molecular weight of 2,000 and a particle size of 3 μm and polypropylene wax powders with a melting point of 115° C., a molecular weight of 20,000 and a particle size of 2 μm were added into the mixed solution of polyvinyl alcohol and sodium carboxymethyl cellulose, a uniform mixture was obtained with stirring, then the uniform mixture was added into the ball mill for grinding to make the particle diameters of aluminum oxide particles, aluminum oxide particles, polypropylene wax powders and polyethylene wax powders less than 2 μm, and the primary slurry was obtained.

Step 2, styrene-acrylic latex and pure acrylic latex was added into the primary slurry obtained in step 1, a uniform mixture was obtained with stirring, the uniform mixture was filtrated by a 300-mesh screen, and a coating slurry was obtained, where a weight ratio of aluminum oxide particles, zirconium oxide particles, polypropylene wax powders, polyethylene wax powders, styrene-acrylic latex, pure acrylic latex, polyvinyl alcohol and sodium carboxymethyl cellulose was 10:30:10:40:2.5:2.5:1.25:3.75.

Step 3, the coating slurry obtained in step 2 was coated on a surface of polypropylene/polyethylene/polypropylene composite membrane by intaglio printing, which was followed by a drying, and the separator of the lithium-ion battery with a thickness of 4 μm was obtained.

Thermal shrinkage tests and puncture strength tests and shutdown temperature tests were conducted on the separators in examples 1-6 and comparative examples 1-2, results were shown in Table 1. Moreover, FIG. 1 further provided monitor curves of the shutdown temperatures of the separators in examples 1-3 and comparative example 1.

TABLE 1 results of thermal shrinkage tests and puncture strength tests of the separators in examples 1-6 and comparative examples 1-2.

| group | 90° C./3 h thermal shrinkage | | 130° C./1 h thermal shrinkage | | puncture strength | shutdown temperature |
|---|---|---|---|---|---|---|
| | MD | TD | MD | TD | (kgf) | (° C.) |
| example 1 | 0.80% | 0.10% | 3.20% | 2.10% | 0.353 | 102 |
| example 2 | 1.20% | 0.40% | 3.30% | 2.20% | 0.355 | 107 |
| example 3 | 1.50% | 0.80% | 4.50% | 3.20% | 0.345 | 120 |
| example 4 | 0.60% | 0.05% | 3.10% | 1.95% | 0.365 | 110 |
| example 5 | 2.10% | 1.10% | 6.00% | 4.20% | 0.335 | 98 |
| example 6 | 1.80% | 0.95% | 5.00% | 3.50% | 0.350 | 115 |
| comparative example 1 | 15.0% | 5.0% | 24.0% | 20.0% | 0.325 | 133 |
| comparative example 2 | 0.70% | 0.10% | 3.10% | 2.00% | 0.349 | 135 |

It can be seen from table 1: compared with comparative example 1, the separator of the present disclosure can significantly improve the thermal shrinkage performance, and thus can prevent a short circuit between the positive electrode plate and the negative electrode plate from being established, this was because, similar to comparative example 2, the surface of the separator of the present disclosure was provided with the coating which comprised ceramic particles. However, it can be seen from table 1: as the weight percentage of the solid polymer wax increased, the improving effect of the thermal shrinkage of the separator would decrease, therefore the weight percentage of the solid polymer wax should be appropriate, which was not the more the better. Compared with comparative example 2, the solid polymer wax was added into the separator of the present disclosure, therefore the shutdown temperature was greatly decreased, the solid polymer wax would be gradually melt and enter an interstitial volume among the ceramic particles and into the micropores of the substrate membrane when the temperature reached the melting point of the solid polymer wax, thereby cutting off the channel of the lithium ions, which appeared that the internal resistance would be sharply increased, and when the temperature reached 130° C., which was the melting point of the substrate membrane, the substrate membrane would also be melt to cause the internal resistance to be slightly decreased (as shown in FIG. 1). However, in comparative example 1, when the temperature reached 130° C., the micropores of the substrate membrane would be shut down, the internal resistance would increase, the substrate membrane would flow after being melt to result in a short circuit, and the internal resistance would drop to a lower level.

The separators in examples 1-3 and comparative example 1 each were assembled with a positive electrode plate, a negative electrode plate and an electrolyte into a lithium-ion battery and the number of the respective lithium-ion batteries were indicated as S1-S3 and D1, overcharge tests were conducted on the lithium-ion batteries of S1-S3 and D1 (the test rate was 1 C, the voltage of the lithium-ion battery was 6V), and monitor curves of the overcharged lithium-ion batteries were obtained and respectively shown in FIGS. 2-5.

It can be seen from FIGS. 2-5: the separator of the lithium-ion battery, the number of which was D1, was an untreated separator, after the interior temperature reached the melting point of the separator during the over charging process, the separator would first shrink, then melt, and finally caused a short circuit, the current would sharply increase and the lithium-ion battery would be fired and the temperature would reach 350° C. But when the temperature of the lithium-ion batteries, the number of which were S1-S3, reached 90° C.~115° C. during the over charging process, the solid polymer wax would be melt to cut off the channel of the lithium ions, the temperature would decrease, the current would decrease, and the lithium-ion battery would not be fired or exploded.

In conclusion, the separator of the present disclosure has a better safety performance and more specially a good overcharge resistance performance.

According to the foregoing descriptions and teachings of the present disclosure, appropriate variations and modifications of the above embodiments can occur to a person skilled in the art. Therefore, the present disclosure is not limited to the embodiments disclosed and described in the above, modifications and variations of the present disclosure will also be within the scope of the appended claims. Furthermore, although specific terminologies are used in the present disclosure, these terminologies are merely for convenience of description, and the present disclosure is not limited to that.

What is claimed is:

1. A separator of a lithium-ion battery, comprising:
a substrate membrane; and
a coating provided on a surface of the substrate membrane, the coating comprising 10~70 wt % of ceramic particles, 20~80 wt % of a solid polymer wax and 5~20 wt % of an adhesive, a melting point of the solid polymer wax being 85~120° C., a relative molecular weight of the solid polymer wax being 1,000~25,000, a particle size of the solid polymer wax being 0.5~10 μm and the particle size of the solid polymer wax being larger than a pore size of the substrate membrane;
wherein the coating further comprises 5~15 wt % of a water-soluble polymer thickening agent.

2. The separator of the lithium-ion battery according to claim 1, wherein the ceramic particle is selected from at least one of aluminum oxide particle, zirconium oxide particle and titanium oxide particle.

3. The separator of the lithium-ion battery according to claim 1, wherein the solid polymer wax is selected from at least one of polyethylene wax, polyethylene oxide wax and polypropylene wax.

4. The separator of the lithium-ion battery according to claim 1, wherein the adhesive is selected from at least one of styrene-acrylic latex, pure acrylic latex and styrene-butadiene rubber latex.

5. The separator of the lithium-ion battery according to claim 1, wherein the water-soluble polymer thickening agent is selected from at least one of carboxyethyl cellulose, sodium carboxymethyl cellulose, polyacrylamide, sodium alginate and polyvinyl alcohol.

6. The separator of the lithium-ion battery according to claim 1, wherein a thickness of the coating is 0.5~10 μm.

7. The separator of the lithium-ion battery according to claim 1, wherein an average particle diameter of the ceramic particles is 500~3,000 nm.

8. The separator of the lithium-ion battery according to claim 1, wherein the substrate membrane is selected from at least one of polyethylene membrane, polypropylene membrane, polypropylene/polyethylene/polypropylene composite membrane, aramid membrane and polyimide membrane.

9. A preparation method of a separator of a lithium-ion battery, comprising steps of:
step 1, adding ceramic particles and solid polymer wax powders into water and obtaining a uniform mixture with stirring, then adding the uniform mixture into a ball mill for grinding to make the particle diameters of the ceramic particles and the solid polymer wax powders less than 2 μm, and obtaining a primary slurry;
step 2, adding an adhesive into the primary slurry obtained in step 1 and obtaining a uniform mixture with stirring, then filtrating the uniform mixture by a 300-mesh screen, and obtaining a coating slurry;
step 3, coating the coating slurry obtained in step 2 onto a surface of a substrate membrane by intaglio printing or extrusion coating, which was followed by a drying to obtain a coating, and obtaining a separator of a lithium-ion battery;
the coating comprising 10~70 wt % of ceramic particles, 20~80 wt % of a solid polymer wax and 5~20 wt % of an adhesive, a melting point of the solid polymer wax being 85~120° C., a relative molecular weight of the solid polymer wax being 1,000~25,000, and the particle size of the solid polymer wax being larger than a pore size of the substrate membrane.

10. The preparation method of the separator of the lithium-ion battery according to claim 9, wherein the ceramic particle is selected from at least one of aluminum oxide particle, zirconium oxide particle and titanium oxide particle.

11. The preparation method of the separator of the lithium-ion battery according to claim 9, wherein the solid polymer wax is selected from at least one of polyethylene wax, polyethylene oxide wax and polypropylene wax.

12. The preparation method of the separator of the lithium-ion battery according to claim 9, wherein the adhesive is selected from at least one of styrene-acrylic latex, pure acrylic latex and styrene-butadiene rubber latex.

13. The preparation method of the separator of the lithium-ion battery according to claim 9, wherein the coating further comprises 5~15 wt % of a water-soluble polymer thickening agent.

14. The preparation method of the separator of the lithium-ion battery according to claim 13, wherein the water-soluble polymer thickening agent is selected from at least one of carboxyethyl cellulose, sodium carboxymethyl cellulose, polyacrylamide, sodium alginate and polyvinyl alcohol.

15. The preparation method of the separator of the lithium-ion battery according to claim 9, wherein a thickness of the coating is 0.5~10 μm.

16. The preparation method of the separator of the lithium-ion battery according to claim 9, wherein the substrate membrane is selected from at least one of polyethylene membrane, polypropylene membrane, polypropylene/polyethylene/polypropylene composite membrane, aramid membrane and polyimide membrane.

* * * * *